DEVICES FOR SAMPLING AIR AT HIGH ALTITUDE

Filed Sept. 21, 1966 2 Sheets-Sheet 1

DEVICES FOR SAMPLING AIR AT HIGH ALTITUDE

United States Patent Office 3,521,493 Patented July 21, 1970

3,521,493

DEVICES FOR SAMPLING AIR AT HIGH ALTITUDE

Louis Guizouarn, Grenoble, Isere, Paul Perroud, Meylan, Isere, and Raymond Pannetier, Massy, Essonne, France, assignors to Commissariat a l'Energie Atomique, Paris, France Filed Sept. 21, 1966, Ser. No. 588,654
Claims priority, application France, Sept. 21, 1965, 32,129, 32,130
Int. Cl. G01n *1/24*
U.S. Cl. 73—421.5 10 Claims

ABSTRACT OF THE DISCLOSURE

Air is sampled at high altitudes by carrying a device including a molecular sieve to the desired altitude and drawing air into the device and through the molecular sieve. Liquid nitrogen, stored in the device, is evaporated to maintain the molecular sieve at a low temperature. The device is mounted in insulating structure and the operation of the device is triggered by suitable means. On return to the ground the molecular sieve is heated for the desorption of the different gases therein which are then recovered.

This invention relates to a method of sampling air at high altitude and to devices for the practical application of said method.

The invention is specifically concerned with methods which consist in carrying to high altitudes by high altitude elevating means such as aircraft, rockets or balloons, an apparatus which is capable of sampling a sufficient quantity of high-atmosphere air and of restoring this latter after landing. Among the sampling methods which are already known, reference can be made to the compression of atmospheric air within a reservoir as well as to the condensation of atmospheric gases on cold walls.

The chief aim of the present invention is to provide a method of sampling which meets practical requirements more effectively than has been achieved up to this time, especially by virtue of its simplicity, its ease of operation, the sturdiness and lightness of weight of the devices employed, and also by virtue of the fact that the constituents of the atmospheric air sampled at high altitude are faithfully restored on the ground.

The invention primarily consists in carrying to the sampling altitude by high altitude elevating means such as aircraft, rockets or balloons a molecular sieve which is maintained at a low temperature, in initiating then stopping either by barometric triggering or by remote control means a process of adsorption of the gases containing the atmospheric air by said molecular sieve, in recovering said molecular sieve on the ground and in initiating by heating, pumping and/or trapping by liquid nitrogen the desorption of the different gases which are thus recovered.

The invention further consists of a first device for the practical application of the method, said first device being characterized in that it comprises, within a thermal insulation unit and especially a block of expanded polystyrene which is supported by a damping element and suspended from high-altitude elevating means, an adsorption bed of cylindro-spherical shape filled with suitable molecular sieving and partitioned by means of copper fins brazed onto a central tube which communicates with a light-alloy reservoir containing liquid nitrogen and surrounding said adsorption bed, an air sampling pipe fitted with an electropneumatic valve controlled by a manometric relay and a timing device, a long flexible pipe for the discharge of vaporized nitrogen to the atmosphere beneath said device, fins which are disposed at the top portion of the adsorption bed close to the point at which said air sampling pipe penetrates therein and which are cooled by the circulation of said vaporized nitrogen, a manometric valve which maintains a pressure of the order of 1 bar within said reservoir, the complete assembly being mounted on a rigid frame of aluminum alloy tubing which is in turn coupled to a second frame by means of an elastic suspension system.

The invention also consists of a second device for the application of the method, characterized in that it comprises a reservoir containing cooling fluid at boiling point and that an intense circulation of atmospheric air is established through a heat exchanger and a molecular sieve disposed within said reservoir for the purpose of trapping one or a number of gases of said atmospheric air by means of a blast pump wherein the driving fluid is vapor which is supplied by said cooling fluid and which escapes through an expansion unit then through said blast pump, valves controlled by a timing device, calibrated plugs, thermocouples, a thermal insulation unit and a shock damping element being additionally provided in the device.

Aside from the secondary arrangements outlined above, the invention finally consists in a number of other arrangements which are preferably employed at the same time and which may be considered either separately or in any technically feasible combination, viz:

Said cooling fluid is liquid nitrogen;

Said heat exchanger and said molecular sieve are disposed in coaxial helical ducts which are surrounded by said cooling fluid;

Said vaporized cooling fluid flows prior to arriving in said expansion unit into a pipe which is painted black and disposed externally of the device, and thus receives the heat of solar radiation at a high region of the atmosphere;

The pressure ratio of said expansion unit is adjusted as a function of the altitude at which the gas is to be trapped;

Said gas to be trapped is krypton and said molecular sieve is in that case a Linde sieve, the pores of which have a diameter of 5A.;

In the pipe which conveys atmospheric air from the outlet of said molecular sieve to the inlet of said blast pump, provision is made for a sonic throat which determines the air flow rate;

An expansion bladder is provided in the atomspheric air circulation system in the vicinity of its inlet;

A heating coil is provided around the molecular sieve for the purpose of producing the desorption of said sieve after the device has returned to the ground;

Thermocouples are inserted in the molecular sieve for the purpose of checking the temperature during the desorption process.

The manner in which the invention is carried out will become more readily apparent from the following complementary description and accompanying drawings, and it will be understood that said description and drawings are given solely by way of example without any implied limitation.

Figure 1:
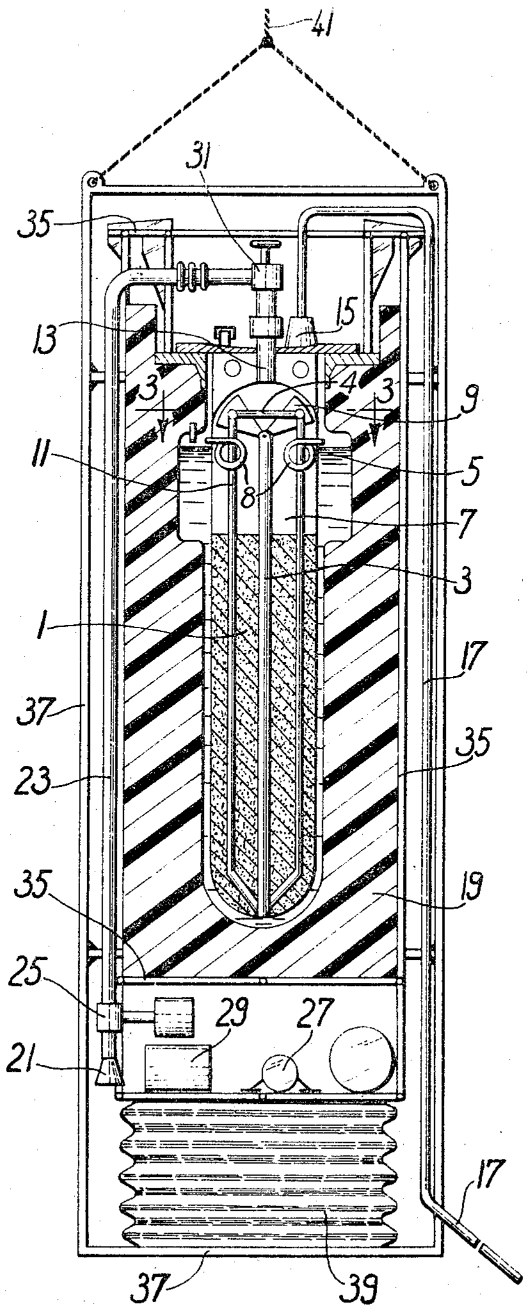
FIGS. 1 and 2 are respectively vertical sectional views of two examples of embodiment of a device in accordance with the invention.

It will be assumed for the sake of example that 1.5 cubic meters of air at normal temperature and pressure are to be collected at an altitude of 30 kilometers.

The physical properties of atmospheric air at this altitude are as follows:

Pressure—12 mb.
Temperature—41° C.
Mass per unit volume—0.0168 kg./m.$^3$

The air which is drawn off is analyzed on the ground with a view to determining the concentrations of its different constituents, in particular the isotopes of hydrogen and carbon: deuterium, tritium, carbon-14, in all their forms. It is also possible to sample gaseous fission products which result from a nuclear explosion and at the same time to sample solid products by fitting a filter at the inlet of the apparatus.

Should a gas or a vapor be contacted with a solid which has previously been degassed, a part of the gaseous phase disappears. This phenomenon is essentially a surface process. The gas molecules are fixed on the surface of the solid. The surface referred-to includes not only the external surface of the body under consideration but also the internal surface of the capillary channel systems (some adsorbents have an internal surface area of 800 m.$^2$ per gram). When equilibrium is established, the quantity of gas adsorbed is dependent on the nature of the adsorbent and on the nature of the gas.

In the case of a given adsorbent, and under identical conditions of temperature and pressure, the adsorbability of a gas (volume of gas adsorbed) depends on other physical properties; it increases with the boiling temperature of the gas, its critical temperature and the values of the van der Waals constants. More simply, it can be stated that the gases which are adsorbed most strongly are the most highly condensable.

The nature of the adsorbent plays a very important part and has an influence on the different types of adsorption isotherms. In recent years, different companies have developed synthetic zeolites having a pore diameter which does not vary. These products, or so-called molecular sieves, when brought to the temperature of liquid nitrogen, strongly adsorb the gases of air, with the exception of hydrogen, neon and helium. The volume of gas adsorbed in the case of the principal constituents varies to a small extent over a wide pressure range.

The adsorption process is selective. However, as has been brought out by experiments involving the adsorption of air into 1 kilogram of molecular sieving, the composition of the desorbed mixture is substantially identical with that of the adsorbed mixture as well as its volume. The process is a reversible one. This holds true in the case of the synthetic molecular sieves but does not apply in the case of the activated carbons which, at the time of desorption of air gases, form carbon dioxide which is produced from the adsorbed oxygen. Thus, by making use of synthetic molecular sieves, it is possible to construct a vacuum pump which is comparable with vacuum pumps of the mechanical type.

Four types of adsorbent can be utilized, namely aluminum hydroxide, silica gel, active carbon and synthetic zeolite.

The two first types have been eliminated inasmuch as the quantity of gas adsorbed in the state of equilibrium is distinctly smaller than in the case of the last two products mentioned.

Active carbon (charcoal) is an adsorbent which exhibits the highest adsorption capacity but combines with the oxygen contained in air at the time of desorption.

Preference has therefore been given to the Linde molecular sieves, types 5A or 13X, which can be completely dehydrated. Sieve 13X is less selective than sieve 5A and adsorbs molecules of large diameter.

Figure 3:
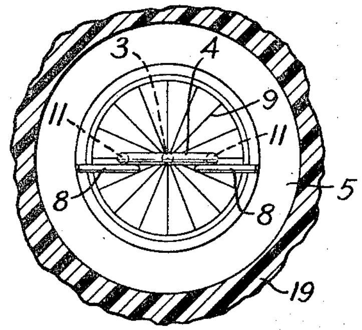
FIG. 3 is a cross sectional view on the line 3—3 of FIG. 1.

Referring to FIGS. 1 and 3, there will now be described hereinafter one example of the device which takes the foregoing considerations into account.

The central portion of the apparatus is constituted by a container of cylindro-spherical shape which is filled with an adsorption bed 1 of molecular sieving. Said bed 1 is partitioned by eight copper fins which have not been shown in the drawing and which are brazed onto a central tube 3, said tube being in turn in communication with the liquid nitrogen reservoir 5. At the top portion of the chamber 7 in which the adsorption bed 1 is placed, there are disposed a series of fins such as the fin 9 which are intended to be heated to the same temperature as the liquid nitrogen by the pipes 11 and 4 for the discharge of the evaporated liquid nitrogen through tubes 8. Said fins 9 are intended to cool the gas which is admitted at 13 into the chamber 7 and to free the water from the carbon dioxide contained in the atmospheric air. The level of liquid nitrogen in the reservoir 5 must be higher than that of the molecular sieve during ascension and throughout the duration of the sampling operation. The pressure within the said reservoir 5 is maintained at approximately 1 bar by means of a manometric valve 15. The vaporized nitrogen is discharged by means of a flexible pipe 17 which extends a distance of 10 meters below the apparatus. The assembly which consists of the adsorption bed 1 and molecular sieve is maintained at a temperature of 77° K., which prevents the condensation of the air which is admitted at 13. The complete assembly is insulated by means of a block 19 of expanded polystyrene. Atmospheric air is drawn in at 21 by cryosorption into a pipe 23 as soon as electropneumatic valve 25 is opened. Valve 25 is controlled by a relay system 27 and timing device 29. A valve 31 can also be provided in the vicinity of the air inlet 13 which communicates with the air-intake horn 21.

The complete assembly as hereinabove described is mounted on a rigid frame 35 of aluminum alloy tubing which is in turn supported on a second frame 37 by a damping element 39. Said frame 37 is intended to be suspended by a cable 41 at a distance of approximately twenty meters beneath a balloon, for example.

One example of utilization of the device referred-to above will now be described, again in reference to FIG. 1.

After careful desorption, the adsorption bed 1 is introduced into the reservoir 5 and the piping is connected. The reservoir is then filled with liquid nitrogen. The apparatus is attached beneath the balloon at a distance of 20 meters. At the sampling altitude, the electropneumatic valve 25 is opened, then automatically closed at the end of a predetermined period of time. The apparatus is then dropped by parachute and recovered. The principal gases contained in the air are strongly adsorbed with the exception of hydrogen, helium, and neon. These latter, which are present in small quantities, are transported by the gas stream and retained in the adsorption bed. The central portion of the apparatus is heated to ambient temperature. Progressively as the temperature rises, the pressure within the chamber rises also. A mixture of pressurized gas enriched with oxygen and argon is collected. A proportion of the initial sample (approximately 5%) which is composed of nitrogen, carbon dioxide gas and water vapor remains adsorbed. The adsorption bed is then heated to a temperature of 250° C. When thermal equilibrium is attained, all the gases are desorbed except for a part of the water. The chamber is pumped by means of a vacuum pump and the residual water is collected by means of a liquid nitrogen trap. After a period of approximately 12 hours, the molecular sieve is freed from water molecules and in readiness for further use.

The apparatus does not call for the use of any mechanical compression system. It employs as cooling fluid liquid nitrogen which is relatively inexpensive, inert and readily obtainable. By regulating the liquid nitrogen pressure, the bath is maintained at a higher temperature than the temperature of liquefaction of the principal gases contained in air at atmospheric pressure. Clogging of the capillary channels of the molecular sieve is thus prevented. The outstanding advantage of said sieve is that it retains its adsorbent power over a wide pressure range (at a given temperature).

Moreover, the apparatus is capable of remaining over long periods of time either immersed in water or on the ground since it is absolutely leak-tight, with the result that the collected sample is maintained in a perfect state of preservation.

Figure 2:
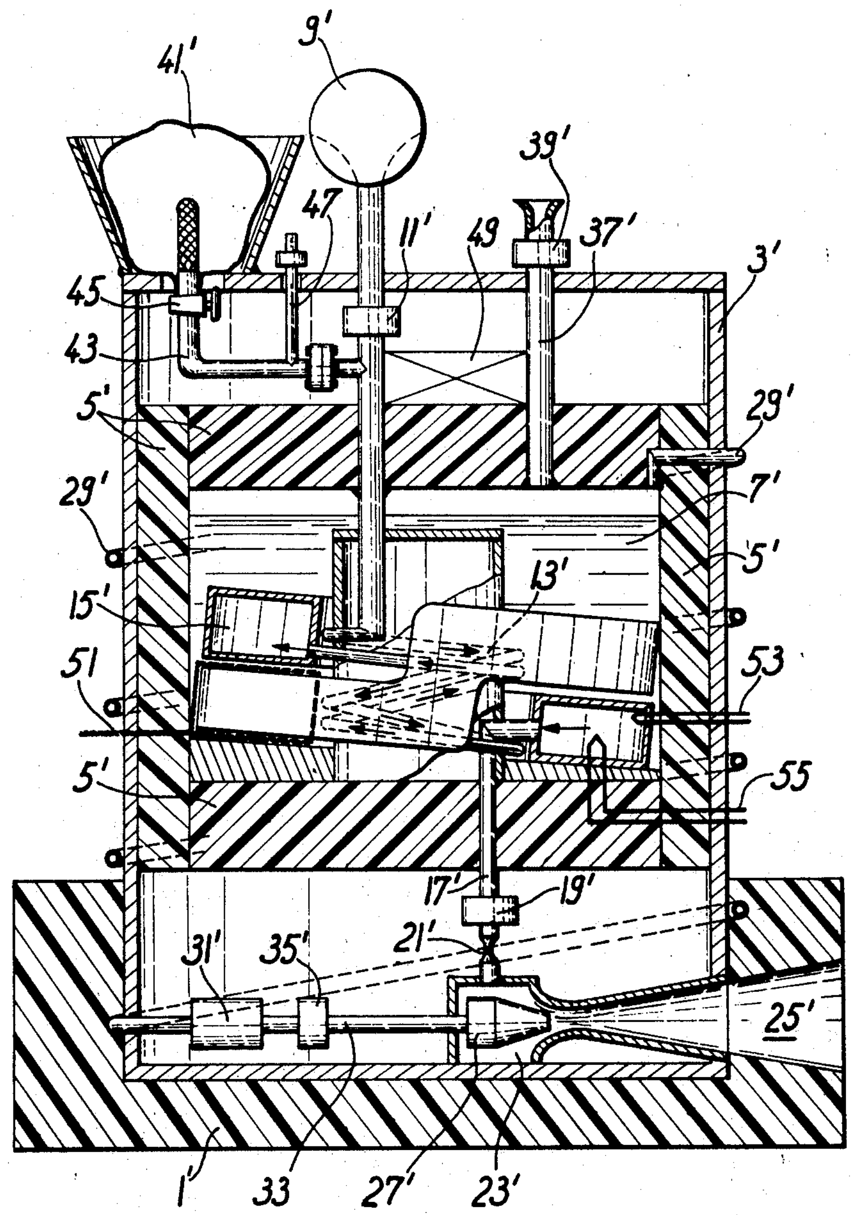

Referring to FIG. 2, there will now be described a second example of embodiment of a device in accordance with the invention.

According to the principle on which the apparatus is based, atmospheric air which is drawn-off at high altitude is passed through a molecular sieve at temperatures in the vicinity of the point of liquefaction of the gas to be trapped, especially krypton, at the pressures considered.

Liquid nitrogen has been chosen as cooling fluid. In fact, when liquid nitrogen is maintained in a closed vessel at a pressure of 1.5 bar, its boiling temperature is 80° K. In the case of liquid oxygen and under the same conditions, the temperature obtained is 94° K. However, in order to ensure optimum trapping, it is necessary to bring the molecular sieve to a temperature which is slightly below the temperature of liquefaction of krypton at the pressure considered, namely 84° and 96° K. at altitudes of 33 to 18 kms. Liquid nitrogen is therefore the cooling fluid which offers the greatest advantage from the point of view both of its heat of vaporization and its boiling temperature as obtained at operating pressure, as well as from the standpoint of ease and convenience of use.

Nitrogen also performs the function of driving fluid. The heat which is yielded by the outer air as it passes into the heat exchanger results in the evaporation of a predetermined quantity of liquid nitrogen. The gas which is produced flows through an expansion unit, the pressure ratio of which is adjusted as a function of the sampling altitude and is accelerated to a high velocity within the blast pump in which it initiates a circulation of air as a result of molecule collisions.

The air in turn yields its heat to the liquid nitrogen and thus supplies the blast pump with driving gas, with the result that the system will be self-maintained until depletion of the coolant, the quantity of gas which is trapped being small compared with the large volume of gas which passes through the molecular sieve.

The adsorbing agent employed is molecular sieving which fixes the gas molecules by surface effect (intermolecular attractions). Said molecules are fixed in pores which have a known diameter for each grade of sieve (diameter of the order of a few A.). For the purpose of trapping krypton, the 5 A. Linde molecular sieve has been selected. The presence of water vapor reduces the time of retention of krypton on the sieve. However, at the sampling altitudes which have been indicated, this parameter is negligible. A further advantage of the molecular sieve is its chemical inertia at the time of desorption. Inasmuch as the adsorption effect is a surface effect, the quantity of gas which is trapped will accordingly decrease with the partial pressure of the adsorbate under analysis. The sieve reaches saturation when a pressure equilibrium is established between the interior and the exterior of the pores.

On a base 1' which serves as a damping element and which can be formed in particular of soft expanded polystyrene, there is mounted a protective casing 3' which will be suspended, for example, from a balloon which can ascend to high regions of the atmosphere. A vessel containing liquid nitrogen 7' is provided within said casing 3' and inside a heat insulation element 5' which can be formed of polystyrene. The atmospheric air at high altitude enters the device through a suction inlet 9' comprising a double-acting valve 11'. The indrawn air flows through a coil 13' which is surrounded by liquid nitrogen 7', then flows into a double torus 15' in which the molecular sieve is placed. After passing through said sieve, the air flows out through the pipe 17' which is fitted with a double-acting valve 19' and a sonic throat 21', then penetrates into the annular portion 23' of a blast pump and is discharged through the cone 25' of this latter. The driving fluid of said blast-pump consists of gaseous nitrogen which is discharged from its nozzle 27' in the form of a jet which has a very high velocity. Said gaseous nitrogen which is intended to draw air into the coil 13' first circulates within the pipe 29' which can advantageously be painted black so as to enhance the action of solar radiation and to heat the gaseous nitrogen. This heating action increases the volume of the gaseous nitrogen, increases its flow rate and therefore the efficiency of the blast pump in which it constitutes the driving fluid. The gaseous nitrogen which is thus heated passes through an expansion unit 31', the pressure ratio of which is adjusted as a function of the sampling altitude and reaches the nozzle 27' of the blast pump by way of a pipe 33 which is fitted with a single-acting valve 35'.

The device in accordance with the invention can also comprise a certain number of ancillary components which are, for example:

- A pipe 37' for the supply of liquid nitrogen, said pipe being closed by a calibrated plug 39', the opening of which is set for a pressure of 1.5 bar;
- An expansion bladder 41' which is fixed on a branch pipe 43 of the atmospheric air system which is fitted with a valve 45 and an outlet pipe 47 for the purpose of evacuating the air circulation system so that, in the event of desorption of the molecular sieve afater closure of the valves 11' and 19', there is no longer any dangerous overpressure within the vessel;
- A timing device 49 for the purpose of controlling the different valves;
- A heating coil 51 which is disposed around the torus 15 so as to permit the operation entailing desorption of the molecular sieve after the apparatus has returned to the ground;
- Thermocouples 53 and 55 which penetrate into the molecular sieve for the purpose of checking the temperature during the desorption operation.

The principal component of the apparatus is the blast pump, the design function of which is to initiate the circulation of air. A jet of gaseous nitrogen is produced at a very high velocity in the axis of the blast pump discharge cone 25'. As a result of molecule collisions, an indraft from the air which is present is created behind the nitrogen supply nozzle 27'. The mass balance of blast pumps of this type, if a certain number of precautions are taken, is such that:

$$\frac{Q}{Q'} > 1$$

wherein:

Q is the mass flow of air; and
Q' is the mass flow of nitrogen.

The addition of a sonic throat 21' at the point at which air is admitted to the blast pump determines the flow rate. It has a disadvantage in that it calls for a blast pump of slightly excessive power, which is in fact the case.

Reference being again made to the figure, there will now be described one example of utilization of the device which is illustrated.

Prior to launching, air is exhausted through the outlet 47 from the heat exchanger system comprising coil 13' and double torus and the molecular sieve, which is then regenerated by heating to 200 or 250° C. for a period of 30 minutes, the valves 11', 19' and 35', being closed. When the appropriate altitude is reached, the opening of said valves is carried out automatically from a manometric control or time control system. In order to obtain a good mass balance from the blast pump, certain precautions must be taken, viz:

(a) The ratio of pressures at the ends of the nitrogen injection nozzle 27' must be of the order of:

$$\frac{P_e}{P_z}\#10$$

wherein:

$P_e$ is the pressure of gaseous nitrogen at the point of admission into the nozzle of the blast pump (or at the outlet of the expansion unit 31')

$P_z$ is the external atmospheric pressure.

It is therefore possible to dispense with the expansion unit at an altitude of 18 kilometers when the external pressure is $P_z\#1/15$ b. The pressure ratio of the expansion unit at 33 kilometers when $P_z\#1/127$ b., must be in the vicinity of 10, $$\frac{\text{Upstream pressure}}{\text{Downstream pressure}}\#10$$

(b) It is also an advantage to limit pressure drops in the air circulation system as far as possible. It is necessary to adopt pipe sections which are sufficient to limit the flow velocity to 20 meters per second. Said pressure drops must not exceed a few units percent. The choice of a 5 A. molecular sieve makes it possible to ensure a good air-sieve contact. Said sieve is disposed within a double torus 15' which is inclined so as to obtain uniform packing and to prevent preferential passages of the circulating air.

The thermal balance of the device can be calculated, for example in the case in which the air is drawn in at 9' at a temperature in the vicinity of —50° C. and in which it is discharged at 19' at a temperature of —196° C. It is assumed that the heat transfer process is complete and that the air at the outlet of the device is therefore at the same temperature as the liquid nitrogen. This heat transfer process represents a temperature drop in the vicinity of 146° C. The specific heat of the air under these conditions is of the order of 0.22 cal./g. If W designates the quantity of heat in calories which is yielded to the liquid nitrogen per second and Q designates the mass flow of air in g. per second, we have:

$$W=0.22\times146Q$$

The heat of vaporization of the liquid nitrogen is 48 cal./g. Assuming that a perfect transfer takes place, it is therefore possible to estimate that the production in grams per second of gaseous nitrogen is:

$$Q'=\frac{0.22\times146}{48}Q=0.67Q$$

namely a mass balance of:

$$\frac{Q}{Q'}\#1.5$$

Moreover, the blast pump will be oversupplied since the inevitable heat losses have the effect of increasing the production of gaseous nitrogen. It is merely necessary in order to circulate the 6.5 kgs. of air which are assumed to have been drawn in at the outset to make provision for a vessel containing approximately 10 liters of liquid nitrogen.

As will be readily apparent, and as has in any case been brought out in the foregoing, the present invention is not limited in any sense to the mode of application or to the example of construction which have been more especially described and illustrated, but is intended, on the contrary to extend to all alternative forms.

What we claim is:

1. A device for sampling air in the upper atmosphere comprising a thermal insulation unit and especially a block of expanded polystyrene which is supported by a damping element and suspended from high-altitude elevating means, an adsorption bed of cylindro-spherical shape inside said insulation unit said bed comprising a molecular sieving, liquid nitrogen surrounding said bed, said bed being partitioned by means of copper fins brazed onto a central tube in said bed which communicates with a light-alloy reservoir containing liquid nitrogen and surrounding said adsorption bed, an air sampling pipe opening into the reservoir above the sieving fitted with an electropneumatic valve controlled by a manometric relay and a timing device, a long flexible pipe opening into the reservoir for the discharge of vaporized nitrogen to the atmosphere beneath said device, fins which are disposed at the top portion of the adsorption bed mounted on the central tube close to the point a which said air sampling pipe opens therein and cooled by the circulation of said vaporized nitrogen, a manometric valve connected into the vaporized nitrogen discharge pipe which maintains a pressure of the order of 1 bar within said reservoir, the complete assembly being mounted on a rigid frame of aluminum alloy tubing which is in turn coupled to a second frame by means of an elastic suspension system.

2. A device for sampling air in the atmosphere comprising a reservoir, a heat exchanger and a molecular sieve within said reservoir, a cooling fluid at the boiling point within said reservoir and surroundng said molecular sieve and said heat exchanger, means for providing an intense circulation of atmospheric air through said heat exchanger and then through said molecular sieve whereby gases of said atmospheric air are trapped by said sieve, said means including a blast pump, the driving fluid of which is the vapor from said cooling fluid which escapes through an expansion unit and then through said blast pump, valves controlled by a timing device for admitting air to said sieve and vapor to said pump, a calibrated plug opening said reservoir to atmosphere at a predetermined pressure, thermocouples measuring the temperature in said sieve, a thermal insulation unit surrounding said reservoir and a shock damping element supporting said device.

3. A device in accordance with claim 2, said heat exchanger and said molecular sieve being disposed along coaxial helical ducts which are surrounded by said cooling fluid.

4. A device in accordance with claim 2, said vaporized cooling fluid flowing prior to arriving in said expansion unit into a pipe which is painted black and disposed externally of the device, and thus receives the heat of solar radiation at a high region of the atmosphere.

5. A device in accordance with claim 2, the pressure ratio of said expansion unit being adjusted as a function of the altitude at which the gas is to be trapped.

6. A device in accordance with claim 2, said gas to be trapped being krypton and said molecular sieve being a Linde sieve, the pores of which have a diameter of 5 A.

7. A device in accordance with claim 2, including in the pipe which conveys atmospheric air from the outlet of said molecular sieve to the inlet of said blast pump, a sonic throat which determines the air flow rate.

8. A device in accordance with claim 2, an expansion bladder being provided in the atmospheric air circulation system in the vicinity of its inlet.

9. A device in accordance with claim 2, a heating coil being provided around the molecular sieve for desorption of said sieve after the device has returned to the ground.

10. A device in accordance with claim 2, thermocouples being inserted in the molecular sieve for checking the temperature during the desorption process.

References Cited

UNITED STATES PATENTS 2,906,125 9/1959 Jewett ............ 73—421.5
3,064,480 11/1962 Sekella ............ 73—421.5

(Other references on following page)

UNITED STATES PATENTS

| | | | |
|---|---|---|---|
| 3,077,779 | 2/1963 | Froehlich et al. | 73—421.5 |
| 3,123,982 | 3/1964 | Brown et al. | 73—421.5 X |
| 3,267,736 | 8/1966 | Boettger. | |

OTHER REFERENCES

Publication: "Gas-Solid Chromatographic Analysis of Fractions From Air Rectification Columns," by S. A. Greene, Analytical Chemistry, vol. 31 (3) 480, 1959.

LOUIS R. PRINCE, Primary Examiner

D. M. YASICH, Assistant Examiner

U.S. Cl. X.R.

23—254; 55—389; 73—23, 170